US012651707B2

(12) United States Patent (10) Patent No.: US 12,651,707 B2
Yoon et al. (45) Date of Patent: Jun. 9, 2026

(54) MULTILAYERED CAPACITOR INCLUDING A DRAWING-OUT PORTION

(71) Applicant: SAMSUNG ELECTRO-MECHANICS CO., LTD., Suwon-si (KR)

(72) Inventors: Changhyun Yoon, Suwon-si (KR); Kiyong Lee, Suwon-si (KR); Kookjoo Moon, Suwon-si (KR); Min-Jung Cho, Suwon-si (KR); Ariwoon Park, Suwon-si (KR); Dahyun Choi, Suwon-si (KR); Jiae An, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 86 days.

(21) Appl. No.: 18/652,054

(22) Filed: May 1, 2024

(65) Prior Publication Data

US 2025/0157741 A1 May 15, 2025

(30) Foreign Application Priority Data

Nov. 15, 2023 (KR) ........................ 10-2023-0157884

(51) Int. Cl.
*H01G 4/30* (2006.01)
*H01G 4/012* (2006.01)
*H01G 4/232* (2006.01)

(52) U.S. Cl.
CPC ............... *H01G 4/30* (2013.01); *H01G 4/012* (2013.01); *H01G 4/232* (2013.01)

(58) Field of Classification Search
None
See application file for complete search history.

(56) References Cited

U.S. PATENT DOCUMENTS 4,353,153 A * 10/1982 Prakash .................... C03C 8/18
361/309
2006/0145401 A1* 7/2006 Mihara .................. H01G 4/232
264/618

(Continued)

FOREIGN PATENT DOCUMENTS

JP 2006-332601 A 12/2006
JP 2013-258230 A 12/2013

(Continued)

OTHER PUBLICATIONS

Extended European Search Report dated Mar. 21, 2025 issued in corresponding European Patent Application No. 24182592.6.

(Continued)

*Primary Examiner* — Eric W Thomas
(74) *Attorney, Agent, or Firm* — Morgan, Lewis & Bockius LLP

(57) ABSTRACT

A multilayered capacitor includes: a body that includes dielectric layers stacked in a first direction and a plurality of internal electrodes disposed to face each other with the dielectric layer interposed therebetween; and an external electrode that is disposed at the body and is connected to the internal electrode. Each of the plurality of internal electrodes includes a capacity portion disposed to overlap the internal electrode adjacent thereto and a drawing-out portion including a protruding portion extending from the capacity portion to be connected to the external electrode and protruding from one surface of the body in a second direction perpendicular to the first direction, the drawing-out portion includes a portion with a thickness greater than a thickness of the capacity portion in terms of a thickness along the first direction.

20 Claims, 7 Drawing Sheets

(56) References Cited

U.S. PATENT DOCUMENTS

| 2006/0245141 | A1 | 11/2006 | Shirasu et al. |
| 2013/0329338 | A1* | 12/2013 | Hiramatsu .............. H01G 4/30 |
| | | | 361/321.2 |
| 2016/0020029 | A1 | 1/2016 | Hirao |
| 2016/0087189 | A1 | 3/2016 | Lee et al. |
| 2018/0301283 | A1* | 10/2018 | Tomizawa ............ H01G 4/005 |
| 2021/0166875 | A1 | 6/2021 | Kang et al. |
| 2021/0193387 | A1 | 6/2021 | Yun et al. |

FOREIGN PATENT DOCUMENTS

| JP | 2015-043423 | A | 3/2015 |
| JP | 5998785 | B2 | 9/2016 |
| JP | 6191621 | B2 | 9/2017 |
| JP | 2022-031952 | A | 2/2022 |
| KR | 10-2016-0035934 | A | 4/2016 |
| KR | 10-2021-0069280 | A | 6/2021 |
| KR | 10-2021-0078010 | A | 6/2021 |
| WO | 2012/114784 | A1 | 8/2012 |
| WO | 2018-231846 | A1 | 12/2018 |

OTHER PUBLICATIONS

Notice of Allowance dated Dec. 26, 2024, issued in corresponding Korean Patent Application No. 10-2023-0157884 with an English translation.
Korean Office Action dated Oct. 18, 2024 issued in Korean Patent Application No. 10-2023-0157884 (with English translation).

* cited by examiner

A

B

MULTILAYERED CAPACITOR INCLUDING A DRAWING-OUT PORTION

CROSS-REFERENCE TO RELATED APPLICATION

This application claims priority to and the benefit of Korean Patent Application No. 10-2023-0157884 filed at the Korean Intellectual Property Office on Nov. 15, 2023, the entire contents of which are incorporated herein by reference.

BACKGROUND

(a) Technical Field

The present disclosure relates to a multilayered capacitor

(b) Description of the Related Art

A multilayered capacitor is a chip-type condenser that is installed at a printed circuit board of various electronic products such as a video device, a computer, a smartphone, a mobile phone, and the like to charge or discharge electricity.

The multilayered capacitor may be used as a component of various electronic devices due to advantages of a small size, high capacity, and easy mounting. As the component of the electronic device has recently become smaller, a demand for miniaturization and high capacity of the multilayered capacitor is increasing.

As microminiaturization and high capacity of the multilayered capacitor progress, thinning of an internal electrode is also required. Accordingly, there is a problem in which a thickness of a body of a portion that the internal electrode does not overlap is reduced and reliability decreases.

SUMMARY

Embodiments are to provide a multilayered capacitor that may improve reliability, may improve connectivity with an external electrode, and may reduce risks of delamination and a radiating crack.

However, problems to be solved by embodiments of the present disclosure are not limited to the above-described problem and may be variously extended in a range of technical ideas included in the present disclosure.

A multilayered capacitor according to an embodiment includes: a body that includes dielectric layers stacked in a first direction and a plurality of internal electrodes disposed to face each other with one of the dielectric layers interposed therebetween; and an external electrode that is disposed on the body and is connected to the internal electrode. Each of the plurality of internal electrodes includes a capacity portion disposed to overlap an internal electrode adjacent thereto and a drawing-out portion including a protruding portion extending from the capacity portion to be connected to the external electrode and protruding from one surface of the body in a second direction perpendicular to the first direction, and a portion having a thickness greater than a thickness of the capacity portion along the first direction, and wherein a ratio of a length of the protruding portion along the second direction to the thickness of the capacity portion is within a range of 0.07 or more and less than 0.1.

The drawing-out portion may further include a portion having a thickness that is along the first direction and that increases toward the outside of the body along the second direction.

The thickness that increases toward the outside of the body gradually increases toward the outside of the body along the second direction along the first direction.

The drawing-out portion may further include a portion having a constant thickness along the first direction.

The protruding portion may include a portion having a constant thickness.

The drawing-out portion may further include a portion having a thickness that is along the first direction and that increases in opposing directions along the first direction and toward the outside of the body along the second direction.

The drawing-out portion may further include a portion having a thickness that is along the first direction and that increases in one direction along the first direction and toward the outside of the body along the second direction.

A ratio of a maximum thickness, which is along the first direction, of the drawing-out portion to an average thickness of the capacity portion may be within a range of greater than 1.2 and less than 2.0.

The protruding portion may be covered by the external electrode.

The body may include a first surface and a second surface facing each other in the first direction, a third surface and a fourth surface facing each other in the second direction, and a fifth surface and a sixth surface facing each other in a third direction perpendicular to the first direction and the second direction, the external electrode may include a first external electrode and a second external electrode, the plurality of internal electrodes may include a first internal electrode and a second internal electrode that are alternately disposed with the one of the dielectric layers interposed therebetween, the first internal electrode may include a first capacity portion and a first drawing-out portion including a first protruding portion extending from the first capacity portion to be connected to the first external electrode and protruding from the third surface of the body, and the second internal electrode may include a second capacity portion that overlaps the first capacity portion in the first direction and a second drawing-out portion including a second protruding portion extending from the second capacity portion to be connected to the second external electrode and protruding from the fourth surface of the body.

The first protruding portion may be covered by the first external electrode, and the second protruding portion may be covered by the second external electrode.

The external electrode may include: a conductive layer disposed on a surface of the body and connected to the plurality of internal electrodes; and a plating layer disposed on the conductive layer.

The protruding portion may have a thickness greater than the thickness of the capacity portion along the first direction.

The protruding portion may be a thickest portion of each of the plurality of internal electrodes.

The length of the protruding portion may be in a range of 28 nm to 40 nm.

According to the multilayered capacitor according to the embodiments, reliability may be improved by improving a shape of a chip, connectivity with an external electrode may be improved, delamination may be prevented, and a risk of a radiating crack may be reduced.

DETAILED DESCRIPTION

Figure 1:
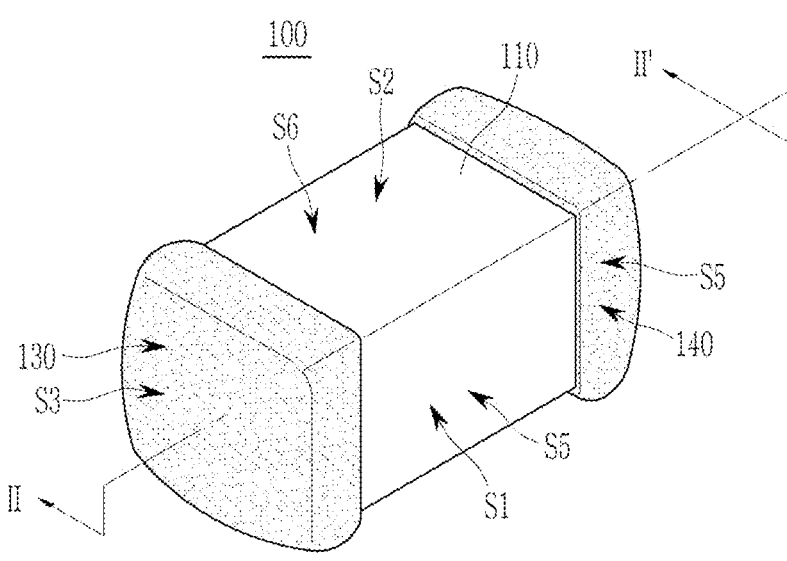
FIG. 1 is a perspective view schematically showing a multilayered capacitor according to an embodiment of the present disclosure.
Figure 1:
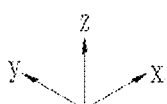

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. In the drawings, size and thickness of each element are arbitrarily illustrated for convenience of description, and the present disclosure is not necessarily limited to as illustrated in the drawings.

In addition, the attached drawing is only for easy understanding of the embodiment disclosed in the present specification, and the technical idea disclosed in this specification is not limited by the attached drawing, and all changes included in the spirit and technical range of the present disclosure, should be understood to include equivalents or substitutes.

Terms including an ordinal number such as first, second, and the like may be used to describe various configurations elements, but the constituent elements are not limited by the terms. The terms are used only for the purpose of distinguishing one constituent element from another.

It will be understood that when an element such as a layer, film, region, or substrate is referred to as being "on" or "above" another element, it may be directly on the other element or intervening elements may also be present. In contrast, when an element is referred to as being "directly on" another element, there are no intervening elements present. Further, throughout the specification, the word "on" or "above" a target element will be understood to be disposed above or below the target element, and will not necessarily be understood to be disposed "at an upper side" based on an opposite to gravity direction.

In the present application, terms such as "comprise" or "have" are intended to designate that a feature, number, step, operation, constituent element, part, or combination thereof described in the specification exists, and it should be understood as not precluding the possibility of the presence or addition of and one or more other features, numbers, steps, actions, constituent elements, parts, or combinations thereof. In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by perpendicularly cutting a target portion from the side.

Throughout the specification, when it is described that a part is "coupled" to another part, the part may be "directly or physically connected" to the other part or "indirectly or non-contact coupled" to the other part with a third part therebetween.

Throughout the specification, when it is described that a part is "connected" to another part, the part may be "directly connected" to the other element, may be "connected" to the other part through a third part, or may be connected to the other part physically or electrically, and may be referred to by different titles depending on positions or functions, but respective portions that are substantially integrated into one body may be connected to each other.

Hereinafter, a direction of a body 110 is defined to clearly describe an embodiment of the present disclosure. X, y, and z shown in the drawings indicate a length direction, a width direction, and a thickness direction of the body 110, respectively. Here, a z-axis direction (the thickness direction; the first direction) may be a direction perpendicular to a wide surface (a main surface) of a constituent element having a sheet shape. For example, the z-axis direction (the thickness direction) may be used as the same concept as a stacking direction in which dielectric layers 111 is stacked. An x-axis direction (the length direction; the second direction) may be a direction that extends parallel to the wide surface (the main surface) of the constituent element having the sheet shape, and may be a direction approximately perpendicular to the z-axis direction (the thickness direction). For example, the x-axis direction (the length direction) may be a direction in which first and second external electrodes 130 and 140 are disposed at both surfaces. A y-axis direction (the width direction; the third direction) may be a direction that extends parallel to the wide surface (the main surface) of the constituent element having the sheet shape, and may be a direction approximately perpendicular to the z-axis direction (the thickness direction) and the x-axis direction (the length direction), and a length of the constituent element having the sheet shape in the x-axis direction (the length direction) may be greater than a width of the constituent element having the sheet shape in the y-axis direction (the width direction).

Therefore, a first direction that is a direction in which the dielectric layer 111 and first and second internal electrodes 121 and 122 are stacked may be the z-axis direction (the thickness direction), and second and third directions that are perpendicular to the first direction and are perpendicular to each other may be the x-axis direction (the length direction) and the y-axis direction (the width direction), respectively.

Figure 2:
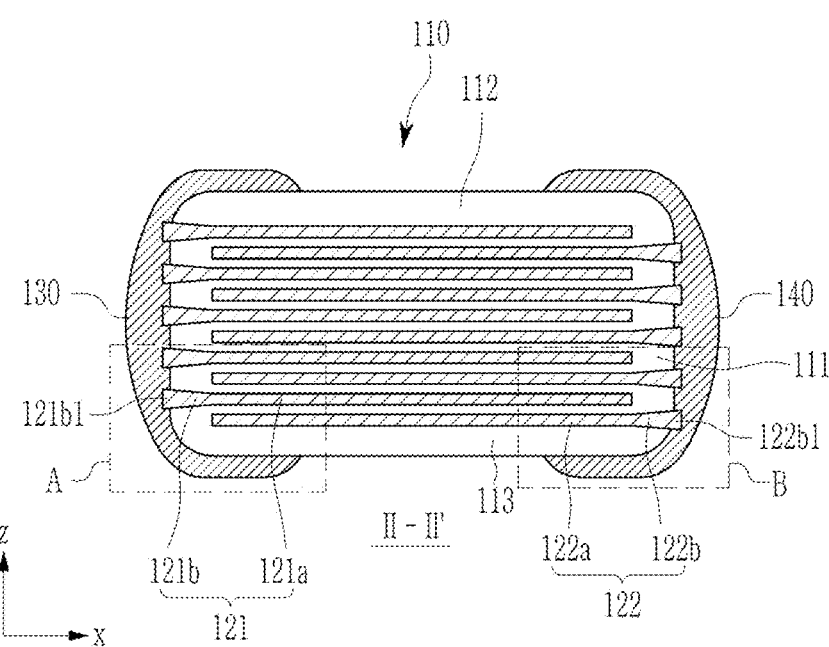
FIG. 2 is a cross-sectional view taken along the line II-II' in FIG. 1.

FIG. 1 is a perspective view schematically showing a multilayered capacitor according to an embodiment of the present disclosure, and FIG. 2 is a cross-sectional view taken along a line II-II' in FIG. 1.

Referring to FIG. 1 and FIG. 2, the multilayered capacitor 100 according to the present embodiment includes the body 110 and the first and second external electrodes 130 and 140.

The body 110 may include a plurality of dielectric layers 111, and a plurality of first internal electrodes 121 and a plurality of second internal electrodes 122 alternately disposed in the z-axis direction with the dielectric layer 111 interposed therebetween The body 110 may be formed by stacking a plurality of dielectric layers 111 in the z-axis direction and then firing the stacked dielectric layers, and a boundary between adjacent dielectric layers 111 may be integrated to an extent that it is difficult to check without using a scanning electron microscope (SEM).

The body 110 may have a thickness along the z-axis direction with a predetermined size, a length along the x-axis direction with a predetermined size, and a width along the y-axis direction with a predetermined size, and may have a substantially hexahedral shape. However, a shape and a dimension of the body 110 and the number of the stacked dielectric layers 111 are not limited to those shown in the drawings of the present disclosure.

For convenience of description of the present embodiment, both surfaces of the body 110 facing each other in the z-axis direction are defined as a first surface and a second surface S1 and S2, both surfaces connected to the first surface and the second surface S1 and S2 and facing each other in the x-axis direction are defined as a third surface and a fourth surface S3 and S4, and both surfaces connected to the first and second surfaces S1 and S2 and the third and fourth surfaces S3 and S4 and facing each other in the y-axis direction are defined as a fifth surface and a sixth surface S5 and S6. Additionally, in the present embodiment, a mounting surface of the multilayered capacitor 100 may be the first surface S1 of the body 110.

The dielectric layer 111 may include a ceramic material with a high dielectric constant. For example, the dielectric layer 111 may include a barium titanate (BaTiO$_3$)-based ceramic powder or a strontium titanate (SrTiO$_3$)-based ceramic powder, but the present disclosure is not limited thereto as long as sufficient capacitance may be obtained.

In addition, a ceramic additive, an organic solvent, a plasticizer, a binder, a dispersant, and the like may be further added to the dielectric layer 111 together with the ceramic powder. For example, transition metal oxide, transition metal carbide, a rare earth element, magnesium (Mg), aluminum (Al), or the like may be used as the ceramic additive.

The body 110 may include an active region that is a portion contributing to forming capacitance of the capacitor, and upper and lower covers 112 and 113 respectively formed at upper and lower portions of the active region in the z-axis direction that are a vertical margin portion.

The upper and lower covers 112 and 113 may have the same material and configuration as those of the dielectric layer 111 except that they do not include an internal electrode.

The upper and lower covers 112 and 113 may be formed by stacking a single dielectric layer or two or more dielectric layers in the z-axis direction on upper and lower surfaces of the active region, respectively. Basically, the upper and lower covers 112 and 113 may serve to prevent damage to the first and second internal electrodes 121 and 122 due to a physical or chemical stress.

The first and second internal electrodes 121 and 122 may be electrodes receiving different polarities, and may be alternately disposed in the z-axis direction with the dielectric layer 111 interposed therebetween. One ends of the first and second internal electrodes 121 and 122 may be exposed from the third and fourth surfaces S3 and S4 of the body 110, respectively. In addition, the one ends of the first and second internal electrodes 121 and 122 may protrude from the third and fourth surfaces S3 and S4 of the body 110, respectively.

The first and second internal electrodes 121 and 122 may be electrically insulated from each other by the dielectric layer 111 disposed between the first and second internal electrodes 121 and 122.

The end portions of the first and second internal electrodes 121 and 122 alternately exposed through the third and fourth surfaces S3 and S4 of the body 110 may be electrically connected to the first and second external electrodes 130 and 140 disposed on the third and fourth surfaces S3 and S4 of the body 110 to be described later, respectively. Therefore, it is possible to improve a bonding strength between the internal electrode and the external electrode, reduce a contact defect, and prevent a decrease in capacity of the multilayered capacitor 100.

Additionally, materials forming the first and second internal electrodes 121 and 122 are not particularly limited. For example, the first and second internal electrodes 121 and 122 may be formed using a conductive paste made of one or more materials of a precious metal material such as platinum (Pt), palladium (Pd), a palladium-silver (Pd—Ag) alloy, or the like, nickel (Ni), and copper (Cu). Here, a printing method of the conductive paste may be a screen printing method, a gravure printing method, or the like, and the present disclosure is not limited thereto.

The first internal electrode 121 may include a first capacity portion (or a first capacitance portion) 121a and a first drawing-out portion (or a first drawn-out portion) 121b. The first capacity portion 121a may be a portion disposed to be spaced apart from the third to sixth surfaces S3, S4, S5, and S6 of the body 110, and may be a portion that contributes to forming capacitance of the capacitor. The first drawing-out portion 121b may be a portion that extends from the first capacity portion 121a to be connected to the first external electrode 130. The first drawing-out portion 121b may extend from the first capacity portion 121a to protrude from the third surface S3 of the body 110. The first drawing-out portion 121b may include a first protruding portion 121b1 protruding in the x-axis direction from the third surface S3 of the body 110.

The second internal electrode 122 may include a second capacity portion (or a second capacitance portion) 122a and a second drawing-out portion 122b. The second capacity portion 122a may be a portion disposed to be spaced apart from the third to sixth surfaces S3, S4, S5, and S6 of the body 110, and may be a portion that contributes to forming capacitance of the capacitor. The second drawing-out portion 122b may extend from the second capacity portion 122a to be connected to the second external electrode 140. The second drawing-out portion 122b may extend from the second capacity portion 122a to protrude from the fourth surface S4 of the body 110. The second drawing-out portion 122b may include a second protruding portion 122b1 protruding in the x-axis direction from the fourth surface S4 of the body 110.

As described above, the first and second internal electrodes 121 and 122 may include the first and second protruding portions 121b1 and 122b1 that protrude to the outside of the body 110, so that contact with the external electrode may be improved.

The first and second drawing-out portions 121b and 122b may be disposed to deviate from each other in the length direction of the body 110 to be alternately exposed at both end portions along the length direction of the body 110.

If a predetermined voltage is applied to the first and second external electrodes 130 and 140, an electric charge is accumulated between the first and second internal electrodes 121 and 122.

Here, capacitance of the multilayered capacitor 100 is proportional to overlapped areas of the first capacity portion 121a of the first internal electrode 121 and the second capacity portion 122a of the second internal electrode 122 that overlap each other along the z-axis direction in the active region of the body 110.

The first and second external electrodes 130 and 140 may be provided with voltages having different polarities, may be disposed at both end portions along the x-axis direction of the body 110, and may be electrically connected to exposed portions of the first and second internal electrodes 121 and 122, respectively. For example, the first external electrode 130 may be electrically connected to a plurality of first drawing-out portions 121*b*, and the second external electrode 140 may be electrically connected to the second drawing-out portion 122*b* that will be described later.

The first external electrode 130 may be disposed on a surface of the body 110. The first external electrode 130 may include a conductive layer (not shown) connected to the plurality of first internal electrodes 121 and at least one plating layer (not shown) disposed on the conductive layer. The plating layer may be disposed to cover the conductive layer. Additionally, the second external electrode 140 may be disposed on the surface of the body 110. The second external electrode 140 may include a conductive layer (not shown) connected to the plurality of second internal electrodes 122 and at least one plating layer (not shown) disposed on the conductive layer. The plating layer may be disposed to cover the conductive layer.

The conductive layer may include a connection portion and a band portion. The connection portion may be disposed on the third surface S3 or the fourth surface S4 of the body 110, and may be connected to protruded portion of the first internal electrode 121 or the second internal electrode 122. The band portion may include a portion extending from the connection portion to a portion of the first surface S1 of the body 110. The band portion may further extend to portions of the fifth and sixth surfaces S5 and S6 and a portion of the second surface S2 of the body 110 to improve an adhesion strength.

The conductive layer may include at least one of copper (Cu) and silver (Ag), and may further include glass, epoxy, and the like. The conductive layer may be formed by applying a conductive paste including a metal and firing the applied conductive paste.

The plating layer may be formed by including nickel (Ni), phosphorus (P), or palladium (Pd). Additionally, the plating layer may be formed by electroless plating. A plating characteristic of the electroless plating may be not significantly different from that of electrolytic plating, and the plating layer formed by the electroless plating may have better corrosion resistance than a film formed by the electrolytic plating, and may grow substantially equally for each position to have a uniform plating thickness. In addition, because the electroless plating performs plating on only an object to be plated without a dummy, it is easier to prepare for the plating and to sort out a defect of the object to be plated after the plating.

Hereinafter, structures of the first and second internal electrodes 121 and 122 will be described in detail with reference to FIG. 2 and FIG. 3.

Figure 3:
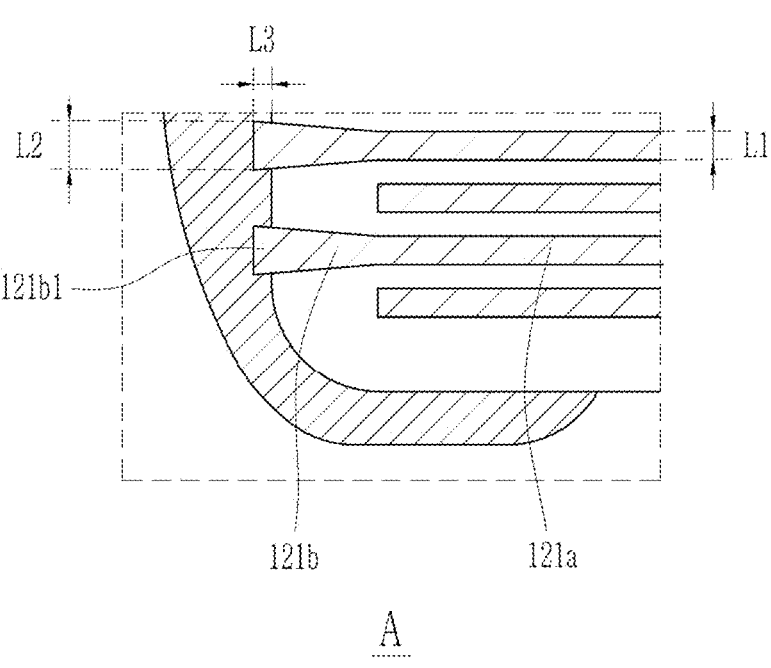
FIG. 3 is an enlarged cross-sectional view of a portion A of FIG. 2.
Figure 4:
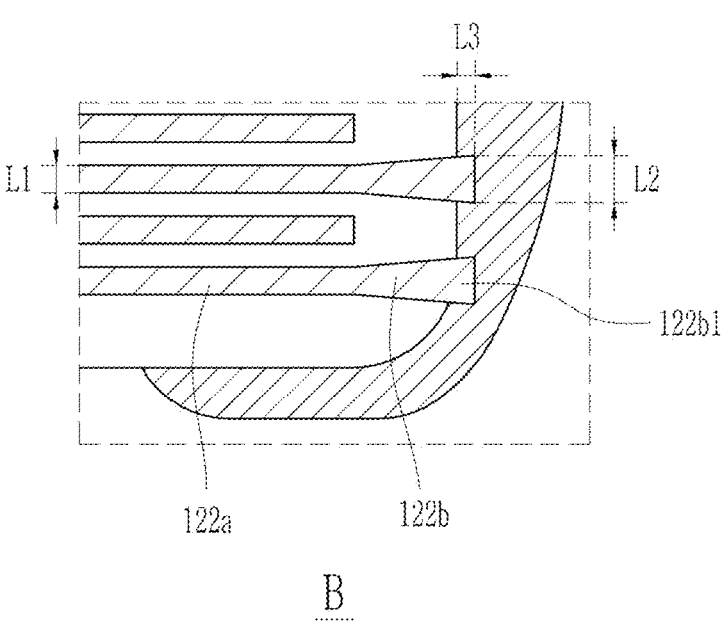
FIG. 4 is an enlarged cross-sectional view of a portion B of FIG. 2.

FIG. 3 is an enlarged cross-sectional view of a portion A of FIG. 2, and FIG. 4 is an enlarged cross-sectional view of a portion B of FIG. 2.

Referring to FIGS. 2 to 4, the first drawing-out portion 121*b* may be disposed at one end of the first capacity portion 121*a*. The first drawing-out portion 121*b* may include a portion having a thickness greater than a thickness L1 along the z-axis direction of the first capacity portion 121*a*. A thickness L2 along the z-axis direction of the first drawing-out portion 121*b* may be greater than the thickness L1 along the z-axis direction of the first capacity portion 121*a*. Additionally, the second drawing-out portion 122*b* may be disposed at one end of the second capacity portion 122*a*. The second drawing-out portion 122*b* may include a portion having a thickness greater than a thickness L1 along the z-axis direction of the second capacity portion 122*a*. A thickness L2 along the z-axis direction of the second drawing-out portion 122*b* may be greater than the thickness L1 along the z-axis direction of the second capacity portion 122*a*.

The thickness L1 of each of the first and second capacity portions 121*a* and 122*a* may be a length of an arbitrary line segment connected from one point of a lower surface of each of the first and second capacity portions 121*a* and 122*a* to an upper surface thereof or an arithmetic average value of lengths of a plurality of line segments connected from the one point of the lower surface of each of the first and second capacity portions 121*a* and 122*a* to the upper surface thereof in an x-z cross-section passing through a central point of the y-axis direction of the multilayered capacitor 100. The plurality of line segments described above may be five or more line segments disposed at equal intervals. The thickness L1 of each of the first and second capacity portions 121*a* and 122*a* may be measured using an optical microscope, a scanning electron microscope, or the like. Other methods and/or tools appreciated by one of ordinary skill in the art, even if not described in the present disclosure, may also be used.

The thickness L2 of each of the first and second drawing-out portions 121*b* and 122*b* may be a length of an arbitrary line segment connected from one point of a lower surface of each of the first and second drawing-out portions 121*b* and 122*b* to an upper surface thereof, a maximum value among lengths of a plurality of line segments connected from the one point of the lower surface of each of the first and second drawing-out portions 121*b* and 122*b* to the upper surface thereof, or an arithmetic average value of the lengths of the plurality of line segments in an x-z cross-section passing through a central point of the y-axis direction of the multilayered capacitor 100. The plurality of line segments described above may be five or more line segments disposed at equal intervals. The thickness L2 of each of the first and second drawing-out portions 121*b* and 122*b* may be measured using an optical microscope, a scanning electron microscope, or the like. Other methods and/or tools appreciated by one of ordinary skill in the art, even if not described in the present disclosure, may also be used.

The first drawing-out portion 121*b* may include the first protruding portion 121*b*1 at one end thereof. A ratio of a length L3 along the x-axis direction of the first protruding portion 121*b*1 to the thickness L1 of the first capacity portion 121*a* may be in a range of 0.07 or more and less than 0.1. Additionally, the second drawing-out portion 122*b* may include the second protruding portion 122*b*1 at one end thereof. A ratio of a length L3 along the x-axis direction of the second protruding portion 122*b*1 to the thickness L1 of the second capacity portion 122*a* may be in a range of 0.07 or more and less than 0.1.

As an example, the ratio of the length L3 along the x-axis direction of the first protruding portion 121*b*1 to the thickness L1 of the first capacity portion 121*a* may be in a range of 0.07 or more and 0.09 or less. Additionally, the ratio of the length L3 along the x-axis direction of the second protruding portion 122*b*1 to the thickness L1 of the second capacity portion 122*a* may be in a range of 0.07 or more and 0.09 or less.

The length L3 of each of the first and second protruding portions 121*b*1 and 122*b*1 may be a maximum value, a minimum value, or an arithmetic average value of lengths of a plurality of line segments connected from one end of each of the first and second protruding portions 121*b*1 and 122*b*1 to the other end thereof in an x-z cross-section passing through a central point of the y-axis direction of the multilayered capacitor 100. The plurality of line segments described above may be five or more line segments disposed at equal intervals. The length L3 of each of the first and second protruding portions 121b1 and 122b1 may be measured using an optical microscope, a scanning electron microscope, or the like. Other methods and/or tools appreciated by one of ordinary skill in the art, even if not described in the present disclosure, may also be used.

TABLE 1

| Ratio of length of protruding portion to thickness of capacity portion | Length conversion [nm] | Radiating crack rate [%] |
|---|---|---|
| Less than 0 | — | Unable to connect electrode |
| 0 or more and less than 0.04 | 0-15 | 76.6 |
| 0.04 or more and less than 0.07 | 15-30 | 53.6 |
| 0.07 or more and less than 0.10 | 30-40 | 1.3 |
| 0.10 or more | 40 or more | Falling out of electrode |

Referring to Table 1, if the ratio of the length L3 of the first protruding portion 121b1 to the thickness L1 of the first capacity portion 121a or the ratio of the length L3 of the second protruding portion 122b1 to the thickness L1 of the second capacity portion 122a is less than 0.07, a radiating crack may be highly likely to occur. If the ratio of the length L3 of the first protruding portion 121b1 to the thickness L1 of the first capacity portion 121a or the ratio of the length L3 of the second protruding portion 122b1 to the thickness L1 of the second capacity portion 122a is 0.1 or more, a falling out of the electrode may occur. If the ratio of the length L3 of the first protruding portion 121b1 to the thickness L1 of the first capacity portion 121a or the ratio of the length L3 of the second protruding portion 122b1 to the thickness L1 of the second capacity portion 122a is 0.07 or more and less than 0.1, a risk of the radiating crack may be reduced.

For example, thicknesses of the first and second internal electrodes 121 and 122 may be 360 nm to 440 nm or 400 nm. Here, the length L3 along the x-axis direction of each of the first and second protruding portions 121b1 and 122b1 may be within a range of 28 nm to 40 nm.

As the first and second drawing-out portions 121b and 122b move toward the outside of the body 110 along the x-axis direction, the first and second drawing-out portions 121b and 122b may include a portion in which a thickness increases along the z-axis direction. Specifically, the first and second drawing-out portions 121b and 122b may include the portion whose thickness gradually increases toward the outside of the body 110 along the x-axis direction. In other words, the first and second drawing-out portions 121b and 122b may have a constant ratio of the amount of change in the z-axis direction to the amount of change in the x-axis direction, the first and second drawing-out portions 121b and 122b may have a straight line shape with a constant slope. Additionally, the first and second drawing-out portions 121b and 122b may include a portion whose thickness increases in both vertical directions along the z-axis direction toward the outside of the body 110 along the x-axis direction.

A ratio of a maximum thickness along the z-axis direction of the first drawing-out portion 121b to the thickness L1 along the z-axis direction of the first capacity portion 121a may be in a range of more than 1.2 and less than 2.0. Additionally, a ratio of a maximum thickness along the z-axis direction of the second drawing-out portion 122b to the thickness L1 along the z-axis direction of the second capacity portion 122a may be in a range of more than 1.2 and less than 2.0.

As an example, the ratio of the maximum thickness along the z-axis direction of the first drawing-out portion 121b to the thickness L1 along the z-axis direction of the first capacity portion 121a may be in a range of 1.3 or more and 1.9 or less. Additionally, the ratio of the maximum thickness along the z-axis direction of the second drawing-out portion 122b to the thickness L1 along the z-axis direction of the second capacity portion 122a may be in a range of 1.3 or more and 1.9 or less.

If the ratio of the maximum thickness along the z-axis direction of the first drawing-out portion 121b to the thickness L1 along the z-axis direction of the first capacity portion 121a or the ratio of the maximum thickness along the z-axis direction of the second drawing-out portion 122b to the thickness L1 along the z-axis direction of the second capacity portion 122a is 1.2 or less, an effect of improving high-temperature reliability may be small. If the ratio of the maximum thickness along the z-axis direction of the first drawing-out portion 121b to the thickness L1 along the z-axis direction of the first capacity portion 121a or the ratio of the maximum thickness along the z-axis direction of the second drawing-out portion 122b to the thickness L1 along the z-axis direction of the second capacity portion 122a is greater than 2.0, a short circuit may occur due to overlapping of vertically adjacent internal electrodes.

If the ratio of the maximum thickness along the z-axis direction of the first drawing-out portion 121b to the thickness L1 along the z-axis direction of the first capacity portion 121a or the ratio of the maximum thickness along the z-axis direction of the second drawing-out portion 122b to the thickness L1 along the z-axis direction of the second capacity portion 122a is within a range greater than 1.2 and less than 2.0, high-temperature reliability may be improved by increasing a thickness of the dielectric layer at both end edges along the x-axis direction of the body where the first and second drawing-out portions 121b and 122b are disposed.

The first protruding portion 121b1 may be covered by the first external electrode 130. The second protruding portion 122b1 may be covered by the second external electrode 140.

Hereafter, referring to Table 2, a characteristic and a reliability measurement result of the multilayered capacitor 100 according to an embodiment are described. In the multilayered capacitor of an embodiment, a ratio of a thickness of the drawing-out portion to a thickness of the capacity portion may be 1.6.

TABLE 2

| | Comparative Example | Embodiment |
|---|---|---|
| Capacitance (µF) | 5.3 ± 0.13 (DF 3.39% ± 0.18) | 5.15 ± 0.10 (3.20% ± 0.14) |
| BDV (V) | 30.3 ± 7.7 | 40.0 ± 7.9 |
| High-temperature reliability 570 L: | 7.4 ± 6.1 | 9.1 ± 8.8 |
| MTTF (hr) 125° C. 1.5 vr 400 L: | 10.6 ± 7.5 | 16.1 ± 9.7 |
| Thickness of drawing-out portion (nm) | 390 ± 25 | 532 ± 92 |

Referring to Table 2, it may be seen that the multilayered capacitor 100 of the embodiment has the breakdown voltage (BDV) increased by about 33% and the high-temperature reliability increased by about 23% or about 52% compared with the comparative example. Hereinafter, a result of measuring a step difference between adjacent internal electrodes of both end edges along the x-axis direction of the body 110 where the first and second drawing-out portions 121*b* and 122*b* of the multilayered capacitor 100 according to an embodiment are disposed will be described with reference to Table 3. An angle may mean an angle at which the drawing-out portions 121*b* and 122*b* are inclined with respect to a line parallel to the x-axis. A step difference between adjacent drawing-out portions 121*b* and 122*b* of both end edges of the x-axis direction of the body 110 and inclined angles of the drawing-out portions 121*b* and 122*b* may be measured by observing a cross-section of the multilayered capacitor using an optical microscope, a scanning electron microscope, or the like.

TABLE 3

|  | Comparative Example | Embodiment |
|---|---|---|
| Step difference (μm) | 25.5 | 23.8 |
| Angle (degree) | 44 | 33 |

Referring to Table 3, it may be seen that the multilayered capacitor 100 of the embodiment has a smaller step difference than that of the comparative example and has a smaller inclined angle than that of the comparative example. Therefore, a problem of deterioration of the BDV and a highly accelerated life test (HALT) due to cumulative stacking at both end edges of the x-axis direction of the body 110 may be improved, and electrode connectivity with the external electrode may be improved. Hereinafter, an evaluation result of the radiating crack of the multilayered capacitor 100 according to an embodiment will be described with reference to Table 4. The multilayered capacitor of the comparative example and the embodiment may be a capacitor singly applied by dipping in Cu.

The evaluation of the radiating crack may be performed at 730° C. for 70 minutes. The radiating crack may be a crack generated by a force that the external electrode pushes into the body.

TABLE 4

|  | Number of radiating cracks | |
|---|---|---|
|  | Comparative Example | Embodiment |
| Experiment 1 | | |
| Burned down once | X/30 | X/30 |
| Burned down twice | 17/30 | X/30 |
| Burned down 3 times | 26/30 | 4/30 |
| Experiment 2 | | |
| Burned down once | 3/30 | X/30 |
| Burned down twice | 23/30 | X/30 |
| Burned down 3 times | 29/30 | X/30 |

Figure 5:
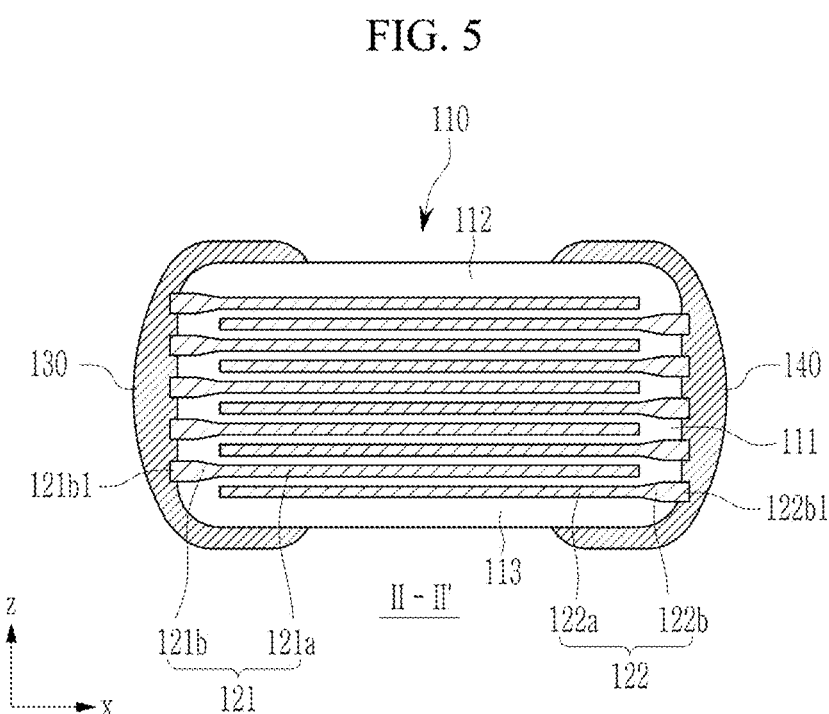
FIG. 5 is a cross-sectional view showing a portion of the multilayered capacitor according to a modified example taken along the line II-II' in FIG. 1.

Referring to the Table 4, it may be seen that occurrence of radiating cracks of the multilayered capacitor 100 of the embodiment is reduced as compared to the comparative example. Hereinafter, the first and second drawing-out portions 121*b* and 122*b* of the multilayered capacitor according to a modified example will be described with reference to FIG. 5. FIG. 5 is a cross-sectional view showing a portion of the multilayered capacitor according to the modified example taken along the line II-II' in FIG. 1.

Figure 6:
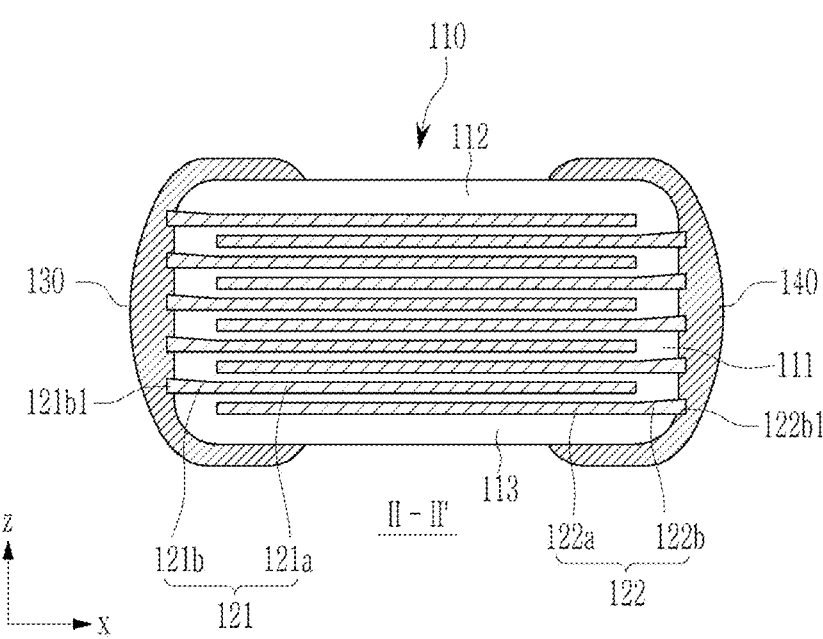
FIG. 6 is a cross-sectional view showing a portion of the multilayered capacitor according to another modified example taken along the line II-II' in FIG. 1.

Unlike the multilayered capacitor according to the above-described embodiment, in the multilayered capacitor according to the modified example, the first and second drawing-out portions 121*b* and 122*b* may include a portion having a constant thickness along the z-axis direction. In addition, for example, the first and second protruding portions 121*b*1 and 122*b*1 may include a portion having a constant thickness along the z-axis direction. A portion having a constant thickness is one in which the thickness deviates, for example, 1% or less as compared to the maximum and minimum thicknesses of the portion Hereinafter, the first and second drawing-out portions 121*b* and 122*b* of the multilayered capacitor according to another modified example will be described with reference to FIG. 6. FIG. 6 is a cross-sectional view showing a portion of the multilayered capacitor according to the other modified example taken along the line II-II' in FIG. 1.

Unlike the multilayered capacitor according to the above-described embodiment, in the multilayered capacitor according to the modified example, the first and second drawing-out portions 121*b* and 122*b* may include a portion whose thickness increases in one direction along the z-axis direction toward the outside of the body 110 along the x-axis direction. For example, the first and second drawing-out portions 121*b* and 122*b* may include a portion whose thickness increases in an upper direction along the z-axis direction toward the outside of the body 110 along the x-axis direction. However, the present disclosure is not limited thereto, and as another example, the first and second drawing-out portions 121*b* and 122*b* may include a portion whose thickness increases in a lower direction along the z-axis direction toward the outside of the body 110 along the x-axis direction.

Figure 7:
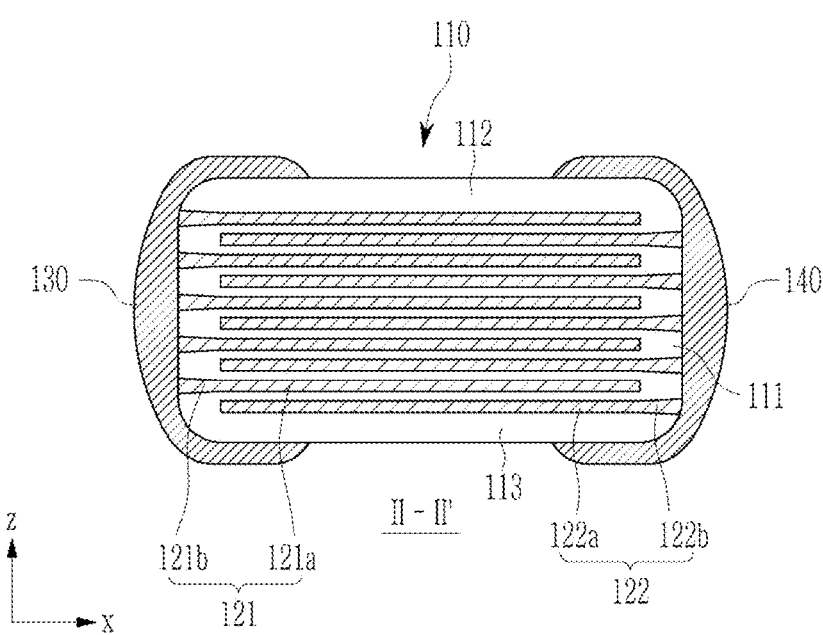
FIG. 7 is a cross-sectional view showing a portion of the multilayered capacitor according to another modified example taken along the line II-II' in FIG. 1.

Hereinafter, the first and second drawing-out portions 121*b* and 122*b* of the multilayered capacitor according to another modified example will be described with reference to FIG. 7. FIG. 7 is a cross-sectional view showing a portion of the multilayered capacitor according to the other modified example taken along the line II-II' in FIG. 1.

Unlike the multilayered capacitor according to the above-described embodiment, in the multilayered capacitor according to the modified example, the first and second drawing-out portions 121*b* and 122*b* may not include the first and second protruding portions 121*b*1 and 122*b*1. In other words, the first drawing-out portion 121*b* may be exposed through the third surface S3 of the body 110, but may not protrude from the third surface S3. Additionally, the second drawing-out portion 122*b* may be exposed through the fourth surface S4 of the body 110, but may not protrude from the fourth surface S4.

According to the multilayered capacitor according to the embodiment and the modified example described above, reliability may be improved by improving a shape of a chip, connectivity with the external electrode may be improved by preventing the drawing-out portion of the internal electrode from being bent, and delamination may be prevented from occurring. In addition, by forming the internal electrode to protrude from the body, contact with the external electrode may be improved, and a risk of the radiating crack may be reduced by increasing a diffusion distance until the crack occurs.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A multilayered capacitor comprising:
a body that includes dielectric layers stacked in a first direction and a plurality of internal electrodes disposed to face each other with one of the dielectric layers interposed therebetween; and
an external electrode that is disposed on the body and is connected to the plurality of internal electrodes,
wherein each of the plurality of internal electrodes includes:
a capacity portion disposed to overlap an adjacent internal electrode among the plurality of internal electrodes, and
a drawing-out portion extending from the capacity portion to be connected to the external electrode and including a protruding portion protruding from one surface of the body in a second direction perpendicular to the first direction, and a portion having a thickness greater than a thickness of the capacity portion along the first direction, and
wherein a ratio of a length of an entirety of the protruding portion along the second direction to the thickness of the capacity portion is within a range of 0.07 or more and less than 0.1.

2. The multilayered capacitor of claim 1, wherein the drawing-out portion further includes a portion having a thickness that is along the first direction and that increases toward the outside of the body along the second direction.

3. The multilayered capacitor of claim 2, wherein the thickness that increases toward the outside of the body gradually increases toward the outside of the body along the second direction.

4. The multilayered capacitor of claim 2, wherein the drawing-out portion further includes a portion having a constant thickness along the first direction.

5. The multilayered capacitor of claim 4, wherein the protruding portion includes a portion having a constant thickness along the first direction.

6. The multilayered capacitor of claim 1, wherein the drawing-out portion further includes a portion having a thickness that is along the first direction and that increases in opposing directions along the first direction and toward the outside of the body along the second direction.

7. The multilayered capacitor of claim 1, wherein the drawing-out portion further includes a portion having a thickness that is along the first direction and that increases in one direction along the first direction and toward the outside of the body along the second direction.

8. The multilayered capacitor of claim 1, wherein a ratio of a maximum thickness, which is along the first direction, of the drawing-out portion to an average thickness of the capacity portion is within a range of greater than 1.2 and less than 2.0.

9. The multilayered capacitor of claim 1, wherein the protruding portion is covered by the external electrode.

10. The multilayered capacitor of claim 1, wherein the body includes a first surface and a second surface facing each other in the first direction, a third surface and a fourth surface facing each other in the second direction, and a fifth surface and a sixth surface facing each other in a third direction perpendicular to the first direction and the second direction, wherein the external electrode includes a first external electrode and a second external electrode,
wherein the plurality of internal electrodes include a first internal electrode and a second internal electrode that are alternately disposed with the one of the dielectric layers interposed therebetween,
wherein the capacity portion includes:
a first capacity portion and
a second capacity portion that overlaps the first capacity portion in the first direction,
wherein the drawing-out portion includes:
a first drawing-out portion extending from the first capacity portion to be connected to the first external electrode, and
a second drawing-out portion extending from the second capacity portion to be connected to the second external electrode,
wherein the protruding portion includes:
a first protruding portion protruding from the third surface of the body and
a second protruding portion protruding from the fourth surface of the body,
wherein the first internal electrode includes:
the first capacity portion and
the first drawing-out portion, where the first drawing-out portion includes the first protruding portion, and
wherein the second internal electrode includes:
the second capacity portion and
the second drawing-out portion extending, where the second drawing-out portion includes the second protruding portion.

11. The multilayered capacitor of claim 10, wherein the first protruding portion is covered by the first external electrode, and the second protruding portion is covered by the second external electrode.

12. The multilayered capacitor of claim 1, wherein the external electrode comprises:
a conductive layer disposed on a surface of the body and connected to the plurality of internal electrodes; and
a plating layer disposed on the conductive layer.

13. The multilayered capacitor of claim 1, wherein the protruding portion has a thickness greater than the thickness of the capacity portion along the first direction.

14. The multilayered capacitor of claim 1, wherein the protruding portion is a thickest portion of each of the plurality of internal electrodes.

15. The multilayered capacitor of claim 1, wherein the length of the protruding portion is in a range of 28 nm to 40 nm.

16. The multilayered capacitor of claim 1, wherein the drawing-out portion further includes a portion having a thickness that is along the first direction and that increases toward the outside of the body along the second direction, and
wherein a ratio of a maximum thickness, which is along the first direction, of the drawing-out portion to an average thickness of the capacity portion is within a range of greater than 1.2 and less than 2.0.

17. The multilayered capacitor of claim 1, wherein the drawing-out portion further includes a portion having a thickness that is along the first direction and that increases in opposing directions along the first direction and toward the outside of the body along the second direction, and
wherein a ratio of a maximum thickness, which is along the first direction, of the drawing-out portion to an average thickness of the capacity portion is within a range of greater than 1.2 and less than 2.0.

18. The multilayered capacitor of claim 1, wherein the drawing-out portion further includes a portion having a thickness that is along the first direction and that increases in one direction along the first direction and toward the outside of the body along the second direction, and wherein a ratio of a maximum thickness, which is along the first direction, of the drawing-out portion to an average thickness of the capacity portion is within a range of greater than 1.2 and less than 2.0.

19. The multilayered capacitor of claim 1, wherein the external electrode fills an entire region between the drawing-out portion and an adjacent drawing-out portion of the adjacent internal electrode among the plurality of internal electrodes.

20. The multilayered capacitor of claim 1, wherein the body includes a first surface and a second surface facing each other in the first direction, a third surface and a fourth surface facing each other in the second direction, and a fifth surface and a sixth surface facing each other in a third direction perpendicular to the first direction and the second direction, wherein the plurality of internal electrodes include:

a first internal electrode extending from the third surface and a second internal electrode extending from the fourth surface, wherein the first internal electrode and the second internal electrode are alternately disposed with the one of the dielectric layers interposed therebetween, wherein the capacity portion includes:

a first capacity portion and a second capacity portion that overlaps the first capacity portion in the first direction, wherein the first internal electrode includes the first capacity portion, and wherein the second internal electrode includes the second capacity portion.

\* \* \* \* \*